May 3, 1949. G. B. LOBDELL 2,468,988
FISH LURE
Filed Dec. 18, 1946
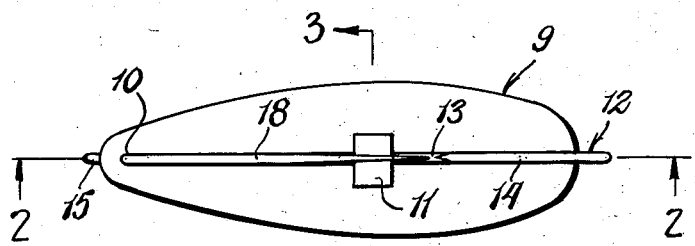
Fig. 1.
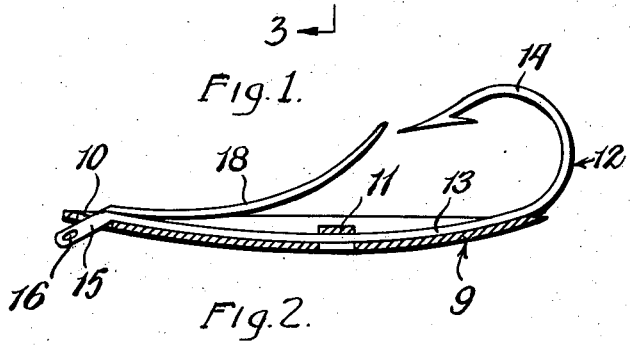
Fig. 2.
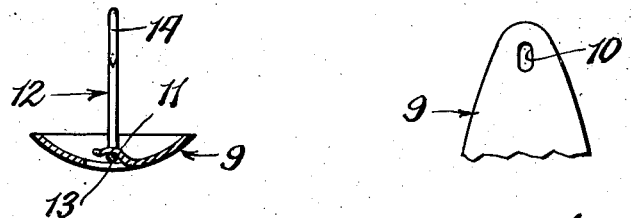 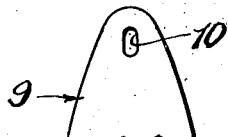
Fig. 3. Fig. 4.
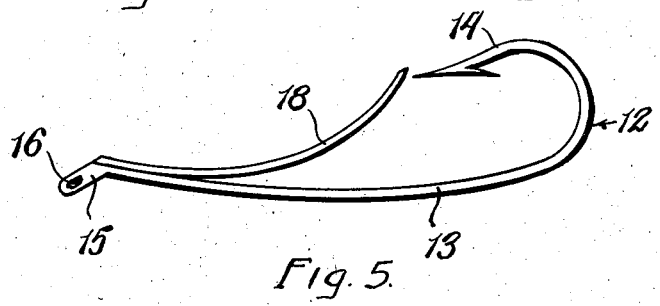
Fig. 5.
INVENTOR.
Garrett B. Lobdell
BY
Popp and Popp
ATTORNEYS Patented May 3, 1949

2,468,988

UNITED STATES PATENT OFFICE 2,468,988

FISH LURE

Garrett B. Lobdell, North Tonawanda, N. Y.

Application December 18, 1946, Serial No. 716,905

4 Claims. (Cl. 43—42)

This invention relates to a fish lure and more particularly to a combined spoon and hook lure in which the spoon is readily detachable from the hook so as to permit of the substitution of a variety of spoons in obtaining the most successful lure.

One of the principal objects of the invention is to provide such a lure in which the spoon is in the form of a simple stamping which can be easily made from stainless steel, brass, plated metal or plastic material at low cost thereby to permit the fisherman to equip himself with a large variety of such lures at very low cost.

Another object is to provide such a lure in which the spoon will be reliable held in operative relation with the hook until intentionally detached therefrom.

Another aim is to provide such a lure in which the substitution of spoons can be easily and quickly effected thereby permitting the fisherman to test out a succession of spoons in short order.

Another aim is to provide such a lure in which the hook is strong and which is connected directly to the line so that the strength of the lure, in landing the fish, is not dependent upon any solder or other connections between the hook and spoon.

Another object is to provide such a lure in which the spoons can be nested together so that a large number of spoons can be carried in a very small space.

Another object is to provide such a lure which is weedless and in which the weed guard for the hook does not interfere with the above features.

Other advantages and objects of the invention will appear from the following description and drawings in which Fig. 1 is a top plan view of a fish lure embodying the present invention.

Fig. 2 is a vertical longitudinal central section taken on line 2—2, Fig. 1.

Fig. 3 is a transverse sectional view taken generally on line 3—3, Fig. 1.

Fig. 4 is a fragmentary view similar to Fig. 1, showing the hook removed.

Fig. 5 is a side elevation of the hook showing the same detached from the spoon.

The spoon, indicated generally at 9, may be of any conventional shape and is shown as being of elongated ovaled shape and as relatively narrow at one end. The spoon is dished so as to provide the desired action when drawn through the water and at its narrow end is provided with an elongated slot 10 which extends lengthwise along the median line of the spoon. Along this median line, the hook is provided with an integral S-shaped finger or hook catch 11, this finger being formed integrally with the body of the spoon by punching the finger from the body. This finger 11 extends from the concave side of the spoon and across its central median line. The spoon can be made in a wide variety of metals, such as stainless steel, brass, copper or plated metal and can be formed of plastic, and can also be produced in a wide variety of colors, shapes or designs, the principal feature of the present invention residing in the provision of a wide variety of shapes and colors of such spoons in the fisherman's kit so that he has a wide variety from which to select in determining which spoon is most successful as a fish lure.

The hook, indicated generally at 12, is shown as made of wire and as having a curving back 13 which conforms to the concave face of the spoon 9 along the central median line thereof. One extremity of this hook is reversely curved and barbed, as indicated at 14, and its opposite end 15 is flattened and bent at an angle to the back 13 of the hook so as to enter the slot 10 in the narrow end of the spoon 9. This end 15 of the hook is provided with an eyelet 16 to permit tying a fishline (not shown) directly to the hook 12. The back 13 of the hook can also have attached thereto a weed guard 18, this being shown as being in the form of a curving wire soldered, welded or otherwise secured to the back 13 of the hook adjacent its end 15 and having its free end arranged in line with the pointed extremity of the hook so as to deflect passing weeds therefrom.

A feature of the invention resides in the relation of the flattened end 15 and barbed end 14 of the hook, these extending laterally from the back 13 of the hook in opposite directions. The flattened end 15 of the hook is also of approximately the same width as the slot 10 to hold the spoon in fixed relation to the hook when assembled.

In use the fisherman provides himself with a hook as illustrated in Fig. 5 and with a large variety of spoons of different shapes, materials and colors. These spoons can nest together so that a large variety of the spoons can be carried by the fisherman in a small space. He then selects the spoon which he regards as the most effective lure and passes the flattened end 15 through the end slot 10 of the selected spoon from the concave side thereof and with the back 13 of the hook extending along the spoon. This back is then bent laterally and brought into engagement with the concave side of the spoon and along the open side of the hook catch or finger 11 and is then moved laterally in the opposite direction to engage the back of the hook under this catch or finger. This hook catch or finger 11 is S-shaped so as to provide a recess or indentation retaining the back of the hook in operative relation to the spoon. Upon tying the fishline in the eyelet 16, the lure is ready for use. It will be seen that the line ties directly with the hook 12 so as to avoid the weakness of holding the fish through solder or other applied connections and it will be seen that the spoon is firmly held in position on the hook. On the other hand, when it is desired to substitute another spoon 9, all that is necessary is to untie the line and move the hook 12 laterally to release it from the finger or catch 11 following which its flattened end can be directly withdrawn from the slot 10.

From the foregoing it will be seen that the present invention provides a lure in which the spoon is readily detachable; the spoon can be produced at low cost and with a variety of materials and in a variety of colors; in which the hook and spoon are reliably held in assembled relation and which is strong, particularly in providing a direct connection between the line and hook.

I claim:

1. A fish lure, comprising a spoon-shaped body having an aperture near one extremity and having a hook-shaped finger offset from a central part of said body to be positioned so as to extend across the longitudinal axis of the body, a hook having a back fitted under said hook-shaped finger and having a reversely bent barbed end, the opposite end of said hook extending through said aperture, and means for securing a fish line to said opposite end of said hook on the convex side of said body.

2. A fish lure, comprising an elongated spoon-shaped body having an elongated slot at one end extending along the longitudinal median line thereof and having a hook-shaped finger offset from a central part of said body to be positioned so as to extend across the longitudinal axis of the body and to extend over said longitudinal line, a hook having a back conforming to the concave face of said spoon and fitted under said hook-shaped hook and having a reversely bent barbed end, the opposite end of said hook extending through said slot, and means for securing a fish lure to said opposite end of said hook from the convex side of said body.

3. A fish lure, comprising an elongated spoon-shaped body having an elongated slot at one end extending along the longitudinal median line thereof, and having a hook-shaped finger offset from a central part of said body to be positioned so as to extend across the longitudinal axis of the body and to extend over said longitudinal median line, a hook having a back fitted under said hook-shaped finger and having a reversely bent barbed end, the opposite end of said hook being bent at an angle relative to said back and in the direction opposite from said barbed end and extending through said slot, and means for securing a fish line to said opposite end of said hook from the convex side of said body.

4. A fish lure, comprising an elongated spoon-shaped body having an elongated slot at one end extending along the longitudinal median line thereof and having an S-shaped finger offset from a central part of said body to be positioned so as to extend across the longitudinal axis of the body and to extend over said longitudinal median line, a hook having a back conforming to the concave face of said spoon and fitted under said S-shaped finger and having a reversely bent barbed end, the opposite end of said hook being bent at an angle relative to said back and in the direction opposite from said barbed end and being flattened to fit the sides of and extend through said slot, and means for securing a fish line to said flattened end of said hook from the convex side of said body.

GARRETT B. LOBDELL.

REFERENCES CITED

The following references are of record in the file of this patent:

UNITED STATES PATENTS

| Number | Name | Date |
|---|---|---|
| Re. 19,671 | Jordan | Aug. 20, 1935 |
| 1,890,400 | Miller | Dec. 6, 1932 |
| 2,088,775 | Davenport | Aug. 3, 1937 |
| 2,214,409 | Eaby | Sept. 10, 1940 |
| 2,255,222 | Leusch | Sept. 9, 1941 |